United States Patent
Candelore

[19]

[11] Patent Number: 5,861,662
[45] Date of Patent: Jan. 19, 1999

[54] ANTI-TAMPER BOND WIRE SHIELD FOR AN INTEGRATED CIRCUIT

[75] Inventor: Brant Candelore, San Diego, Calif.

[73] Assignee: General Instrument Corporation, Horsham, Pa.

[21] Appl. No.: 804,792

[22] Filed: Feb. 24, 1997

[51] Int. Cl.$^6$ .............................. G06K 5/00; G06K 9/00; H04K 1/00

[52] U.S. Cl. .......................... 257/679; 257/784; 257/786; 257/774; 380/24; 380/25; 380/30; 380/4

[58] Field of Search .................................... 257/666, 668, 257/691, 700, 692, 787, 679, 784, 776, 786; 174/52.4; 380/24, 25, 30, 52, 4

[56] References Cited

U.S. PATENT DOCUMENTS

| | | | |
|---|---|---|---|
| 4,293,778 | 10/1981 | Williams | 307/147 |
| 4,747,620 | 5/1988 | Kay et al. | 283/86 |
| 4,914,741 | 4/1990 | Brown et al. | 257/668 |
| 4,926,480 | 5/1990 | Chaum | 380/23 |
| 4,933,898 | 6/1990 | Gilberg et al. | 365/53 |
| 5,053,992 | 10/1991 | Gilberg et al. | 365/53 |
| 5,083,293 | 1/1992 | Gilberg et al. | 365/228 |
| 5,272,754 | 12/1993 | Boerbert | 380/25 |
| 5,422,953 | 6/1995 | Fischer | 380/23 |
| 5,525,834 | 6/1996 | Fischer et al. | 257/691 |
| 5,533,123 | 7/1996 | Force et al. | 380/4 |
| 5,534,857 | 7/1996 | Laing et al. | 380/23 |
| 5,550,406 | 8/1996 | McCormick | 257/666 |
| 5,585,787 | 12/1996 | Wallerstein | 235/380 |
| 5,627,405 | 5/1997 | Chillara | 257/668 |
| 5,651,068 | 7/1997 | Klemba et al. | 380/25 |
| 5,657,394 | 8/1997 | Schwartz et al. | 382/151 |
| 5,696,827 | 12/1997 | Brands | 380/30 |
| 5,719,449 | 2/1998 | Struss | 257/776 |
| 5,723,906 | 3/1998 | Rush | 257/776 |
| 5,790,670 | 8/1998 | Bramlett | 380/52 |

*Primary Examiner*—Tom Thomas
*Assistant Examiner*—Alexander Oscar Williams
*Attorney, Agent, or Firm*—Barry R. Lipsitz; Ralph F. Hoppin

[57] ABSTRACT

An anti-tamper shield for an integrated circuit (IC) includes a bond wire which passes through a protective layer such as an epoxy encapsulating layer of the IC. The bond wire carries a signal, such as a steady state current, which allows an active component of the IC, such as a secure processor, to function. The bond wire is carried within and/or proximate to the encapsulating layer such that a decapsulation of the IC will cause a rupture of the electrically conductive member, thereby rendering the processor non-functional. The bond wire may be coupled to the processor in a variety of configurations, including the use of internal or external bond pads, lead frame contacts, and/or directly to a computer board on which the IC is carried. A metallic shield layer may be located between the active component and a top portion of the encapsulating layer to prevent a pirate from using an electron microscope, for example, to survey the active component region.

21 Claims, 5 Drawing Sheets

ANTI-TAMPER BOND WIRE SHIELD FOR AN INTEGRATED CIRCUIT

BACKGROUND OF THE INVENTION

The present invention relates to the protection of integrated circuits (ICs), and more particularly, to a scheme for preventing the reverse engineering of ICs. The invention is particularly useful in protecting secure ICs which are used in cable and satellite television decoders to prevent unauthorized users from receiving television broadcasts. The invention is equally useful in protecting secure ICs used in other applications, including terminals and smart cards for electronic funds transactions, premises access control, electronic games, and the like.

Due to the continuing popularity of the pay television market, there exists a tremendous financial motivation for unauthorized persons known as "pirates" to modify the access control of set-top boxes (e.g., decoders) to allow the reception of television programming without payment of the required subscription fees. The modified decoders are purchased by unscrupulous individuals through various markets and used to illegally receive and view the television signals.

To produce a modified decoder, a pirate must extract certain information from a genuine decoder which is usually known only to the authorized manufacturer. The decoder typically includes a secure (e.g., cryptographic) processor which contains information such as cryptographic keys which are used in descrambling a scrambled television signal or other programming service signal (e.g., audio or data). Since the secure processor performs access control functions, it is a focal point of the pirate's attention. Accordingly, the pirate will employ various techniques in an attempt to gain information from the secure processor.

One common attack technique is known as "probing." A secure processor includes an integrated circuit (IC) which is fabricated as a monolithic device with an ensemble of active and passive components, including transistors, resistors, capacitors, and diodes which are interconnected within a monolithic block of semiconductor material. During probing, ICs such as very large scale integrated (VLSI) circuits are subject to an invasive attack wherein the die (e.g., IC or "chip") is exposed by decapsulation. During decapsulation, the compound material which encapsulates or surrounds the die is systematically removed. Then, probes which measure current and other parameters are used to monitor the electronic signals in the active components of the chip. The term "tampering" as used herein is meant to encompass both probing and decapsulation.

A pirate may perform the following decapsulation steps to prepare a chip for probing. First, the chip is removed from the decoder board, with the die still inside the IC package. Generally, this is the case when a chip is mounted on a large board. The decoder board may be a computer board such as those used in a personal computer (PC). If the chip requires a direct current from a battery or the like to circumvent a self-destruct feature, then battery wires are soldered to a positive voltage pin (e.g., $V_{batt}$) pin and to a negative voltage pin (e.g., $V_{ss}$) on the outside of the chip prior to removal from the board. The chip is then removed from the board with the battery wires still attached. If the battery power is interrupted, the chip may self-destruct by erasing critical information stored in memory. The pirate can identify the appropriate battery pins by taking resistance measurements of the traces on the board which are connected to the battery, and then confirming by taking voltage readings of the traces with a main voltage (e.g., $V_{cc}$) off.

Second, the location of the die within the encapsulating compound of the IC package can be determined by taking an x-ray of the IC package. Third, a mechanical grinder can be used to remove as much of the encapsulating compound as possible above the top surface of the die without damaging the die. Fourth, chemical etching or plasma etching is performed to remove the last portions of encapsulating compound which remain over the area of the die which is to be probed. Some chemical etchants work so well on the encapsulating compound that the grinding step can often be skipped.

In current chip designs, including those for application specific ICs (ASICs), a pirate will generally not encounter significant obstacles in performing the four steps above. Removal of the chip from the board with the battery wires still attached is usually considered to be the most delicate operation. Thus, the undamaged die, which is protected by an inert glassivation coating, can be exposed by a pirate as long as a short circuit or open circuit of the battery power is not created. Furthermore, damage to bond wires can also easily be avoided. Bond wires may connect bond pads of the chip to package pads in the protective encapsulating package, and are located on the periphery of the device, as will be discussed in greater detail below. The decapsulation process can avoid exposing the die in the area where critical bond pads are located, that is, where the battery power is input into the active component.

One approach to deterring probing is discussed in commonly-assigned U.S. Pat. No. 4,933,898, issued Jun. 12, 1990 to Gilberg et al., entitled "Secure Integrated Circuit Chip With Conductive Shield." Gilberg et al. disclose using one or more conductive layers to overlay a secure area of an IC. The conductive layers shield the secure area from inspection and carry a power signal to the IC. Removal of one of the layers by a pirate causes the loss of power to the components of the secure area. However, the implementation of this approach is somewhat complex.

Accordingly, it would be desirable to provide an apparatus which deters or otherwise hinders probing of an IC chip by a pirate. In particular, it would be desirable to provide a barrier to decapsulation which uses standard bond wires to render the IC non-functional when the bond wire is ruptured. The barrier should be compatible with existing chip designs and inexpensive to implement. The present invention provides a system having the above and other advantages.

SUMMARY OF THE INVENTION

In accordance with the present invention, an anti-tamper shield for an integrated circuit (IC) is presented. The shield is adapted for use with an IC which includes a substrate for carrying an active component, such as a secure processor which may include a memory, CPU, and other microelectronic components. The IC may have a protective layer such as an epoxy encapsulating layer for protecting the processor.

The anti-tamper shield comprises an electrically conductive member such as a bond wire for carrying a signal which allows the processor to function. This signal may include a steady state electrical current which is supplied by a battery via positive and negative terminals. The wire may be carried, at least in part, in a protective layer of the IC such that removal of the protective layer will rupture the wire, thereby causing an open circuit.

The wire may be coupled to the processor in a variety of configurations. For example, the wire may be coupled between a first terminus which is external to the processor and a second terminus which is internal to the processor. Furthermore, the electrically conductive member may extend between points which are external and/or internal to the micro-electronic circuits of the processor. The terminus may be a bond pad within the processor, or a bond pad or lead frame contact outside the processor, for example.

Alternatively, the wire or other electrically conductive member may be coupled between first and second terminuses, both of which are external to the processor. The wire may optionally traverse the top surface of the micro-electronic circuit, and/or may extend in a region away from the micro-electronic circuit and/or processor.

The electrically conductive member may be coupled between first and second terminuses, both of which are internal to the processor.

In another configuration, the electrically conductive member may comprise conductive epoxy, and/or a substance which is tailored to have a desired resistance to an etchant. The conductive epoxy may be printed as a trace over the micro-electronic circuit. In this case, the use of an etchant by a pirate to remove the protective layer of the IC will also destroy the conductive epoxy, thereby terminating the signal which allows the processor to function.

In all configurations, even if a pirate was successful in decapsulating the die with the conductive members intact, the conductive member would pose a physical obstacle to probing with mechanical probes or an electron microscope since a conductive member suspended in space present a hazard that is difficult to overcome. Probes must be continually lifted and reconfigured into new positions by the pirate to allow different angles of approach in order to probe a die and avoid rupturing any of the conductive members. In fact, the electrically conductive member may be formed in a grid pattern to further aggravate probe positioning.

Furthermore, a metallic shield layer may be disposed between the processor and the top portion of the encapsulating layer to prevent a pirate from using an electron microscope, for example, to survey (i.e., map) the processor or the micro-electronic circuits contained therein. The use of a metallic shield in conjunction with the anti-tamper bond-wire shield poses an additional obstacle to the pirate, thereby making the pirate's task more time-consuming and expensive.

The IC may be carried in a smart card. Moreover, a portion of the body of the smart card may provide the encapsulating layer.

Optionally, a wire which does not carry an electrical signal may extend, at least in part, over the micro-electronic component to deter probing of the micro-electronic component. In particular, the wire may form a grid pattern which makes it difficult for a pirate to position and move a probe tip near the micro-electronic component.

DETAILED DESCRIPTION OF THE INVENTION

An anti-tamper apparatus for an integrated circuit (IC) is presented for preventing active components, such as a secure processor used in a television decoder, from being tampered with (e.g., reversed engineered).

Figure 1:
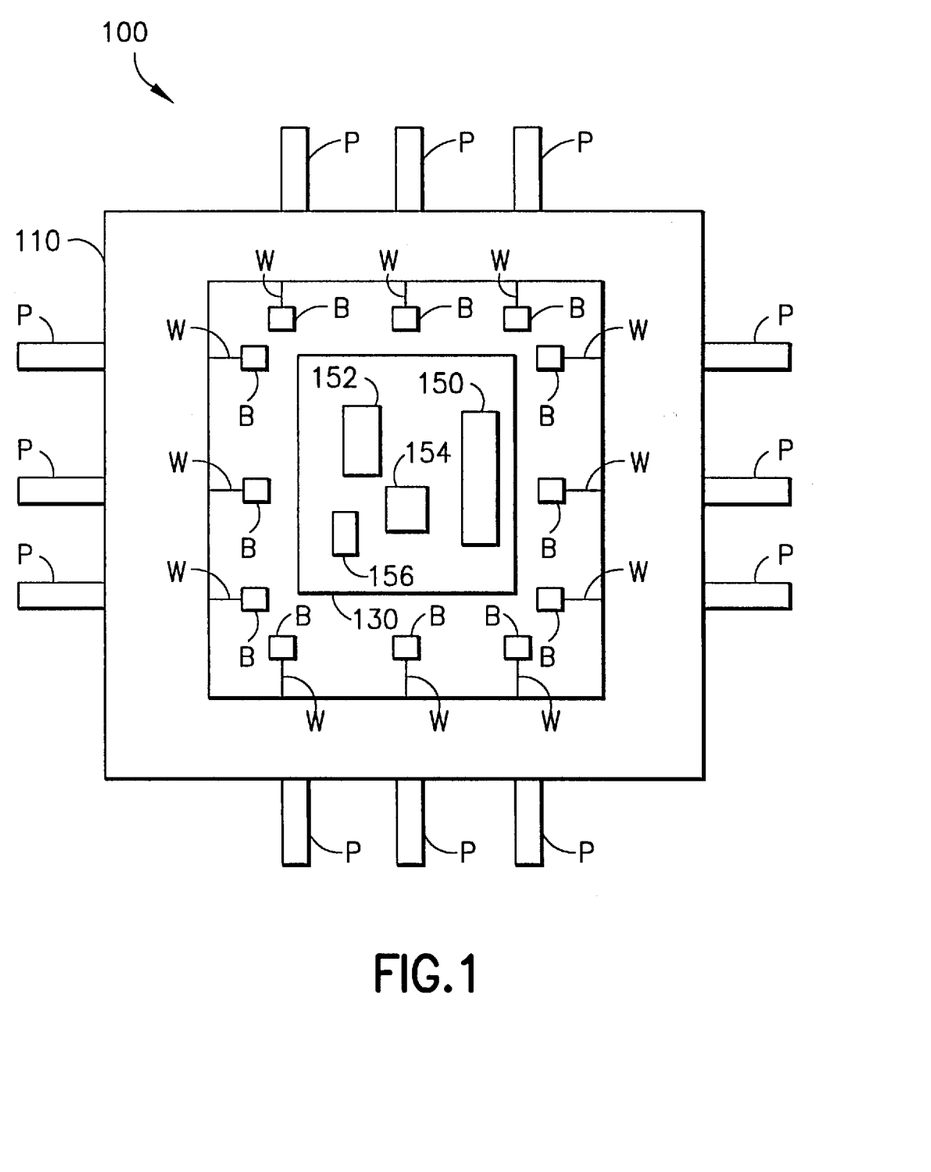
FIG. 1 is a simplified diagram illustrating a decapsulated integrated circuit.

FIG. 1 is a simplified diagram of a decapsulated integrated circuit. The integrated circuit (IC), shown generally at 100, includes an epoxy encapsulating compound region 110. A number of package pins P are connected to respective bond pads B via lead wires W. A bond pad or die pad is one of many metal connection pins that reside in the periphery of the die 130, and are used to couple a unique circuit portion (e.g., input/output (I/O) port) with a corresponding external package pin. The pad pitch is the distance (e.g., in microns) between the midpoints of the adjacent I/O bond pads B. The die can comprise, for example, a silicon micro-chip which contains micro-electronic devices. The package pins P, wires W and bond pads B carry current to and from the IC 100, and are exposed when the epoxy compound which normally covers the die 130 is removed using the decapsulating steps discussed previously.

Wirebond is a step in the die packaging process where thin wires are bonded between the die I/O pads and the package pads. The die 130 includes exemplary active components 150, 152, 154 and 156. In particular, component 150 may be a secure processor which includes cryptographic information. Thus, the die components are exposed and can be probed by a pirate to ascertain the cryptographic information and other operating characteristics of the active components.

Figure 2:
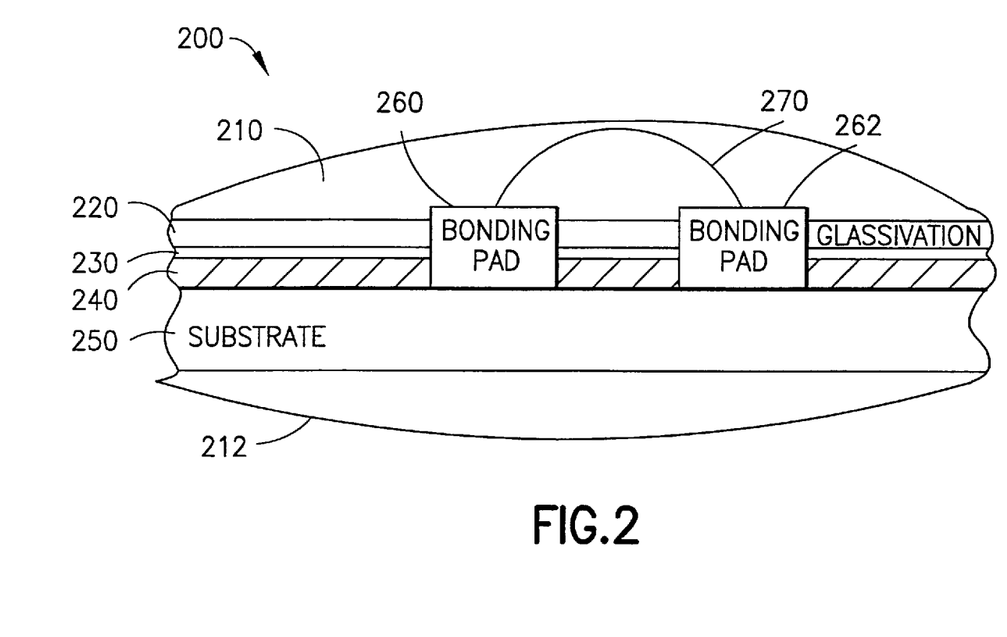
FIG. 2 is a cross-sectional view illustrating an integrated circuit with an anti-tamper bond wire shield in accordance with the present invention.

FIG. 2 is a cross-sectional view of an integrated circuit with an anti-tamper bond wire shield in accordance with the present invention. The IC, shown generally at 200, includes a top epoxy layer 210 and a bottom epoxy layer 212. An electrically conductive member such as a bond wire 270 is shown coupling bond pads 260 and 262. Note that the electrically conductive member need not have a circular cross-section. Thus, it should be understood that the terms "electrically conductive member" and "wire" as used herein are not limited to a single filament member having a circular cross-section, but may encompass configurations including a number of filaments which are wound or twisted together, a configuration with a varying cross section, a configuration with a rectangular cross section, a mesh configuration, a configuration wherein a single wire is coupled to more than two terminals, or virtually any electrically conductive member. In particular, the wires may be provided in a grid pattern with a spacing which is small enough to prevent a probe from passing through the mesh or moving easily within the mesh, as discussed below in conjunction with FIG. 4. In fact, a grid configuration may be used even when the wire does not carry an electrical signal which the processor requires to function. The mere presence of the grid serves as a deterrent to probing.

Furthermore, the electrically conductive member 270 may comprise a substance such as conductive epoxy which is formed by doping epoxy with a conductive material such as silver to achieve a desired conductivity. Advantageously, the epoxy can be selected to have a resistance to etching which is similar to the resistance of the protective layer of the IC, and/or the resistance of the conductive epoxy can be tailored according to a specific etchant which a pirate is expected to use. The conductive epoxy may be printed directly to the surface of the die.

A glassivation layer 220 is also provided. Glassivation refers to an inert protective coating which is placed over the entire surface of a completed die to protect the circuit. Glassivation protects the surface of the die from chemical and moisture contamination, handling damage, and the possibility of shorting the die caused by loose particles. It can also inhibit metal migration and other metal degradation.

A shield 230 is a metal layer that provides current to various components within the IC 200, such as the components 150–156 of FIG. 1. If power to the shield is interrupted, then a secure processing component may self-destruct such that cryptographic data which is stored in the secure processor is erased. Additionally, the shield 230 serves to prevent a pirate from using a scanning electron microscope to detect changes (e.g., voltage changes) in portions of the secure processor, such as a random access memory (RAM), and blurs the distinction between parts which are coated by the shield. The shield may be located within the encapsulating layer, which includes one or more protective layers which are disposed above the chip in the substrate 250. A passivation layer 240 is a protective surface coat comprising, for example, silicon dioxide which is deposited over the surface of the die during various diffusion steps. The substrate 250 is the physical material upon which the IC is fabricated or assembled. For a monolithic device, the substrate typically comprises silicon.

As discussed, a chip such as an ASIC can be decapsulated by a pirate to expose the die in a relatively straightforward manner even when the die has a battery powered self-destruct feature. In accordance with the present invention, one or more electrically conductive members such as standard bond wires of the type used to connect a bond pad with a package pad, such as bond wire 270, are situated to cover the die such that an anti-tamper shield is formed. In particular, during fabrication of a chip, the encapsulating compound is in a molten state and flows around and below the anti-tamper bond wire which are suspended over the die. When the compound (e.g., layer 210) has solidified, it provides a formidable obstacle as it is more difficult for a pirate to use mechanical grinding equipment to remove the wire-embedded layer for fear of breaking (e.g., rupturing) the bond wires and initiating the self-destruct feature of the secure processor.

For example, in the case of a cryptographic chip powered by a direct current from a battery or the like, if the electrically conductive member is ruptured, power to a RAM which maintains the secret data will be cut, thereby causing the data to be erased. If a electrically conductive member is used in a component which did not have a battery powered erasure feature, then the electrically conductive member may instead carry various control signals. However, even the rupturing of such a control signal-carrying electrically conductive member without the erasure of secret data would thwart a pirate's probing attack until the pirate performed the necessary time-consuming and difficult repair.

Moreover, even if a pirate could somehow carefully remove the layer 210 without rupturing the electrically conductive member, by the time the epoxy below the conductive member is etched, the conductive member may be eaten away and ruptured due to the corrosivity of the etchant. This is true since the metal in the conductive member is chosen to react to the chemical etchants which are useful in etching the epoxy. Thus, it may be desirable to choose a material such as aluminum, which has a relatively low resistance to etchants. Other metals, such as gold, have a relatively high resistance to etchants. Moreover, if a conductive member is powered by a battery, etchants will react in a more aggressive way. Generally, the selection of the conductive member material can be tailored to provide a desired resistance to particular etchants. Conductive epoxy is particularly useful as it may be formulated to have a similar resistance to etching as the epoxy encapsulating layer.

Figure 3:
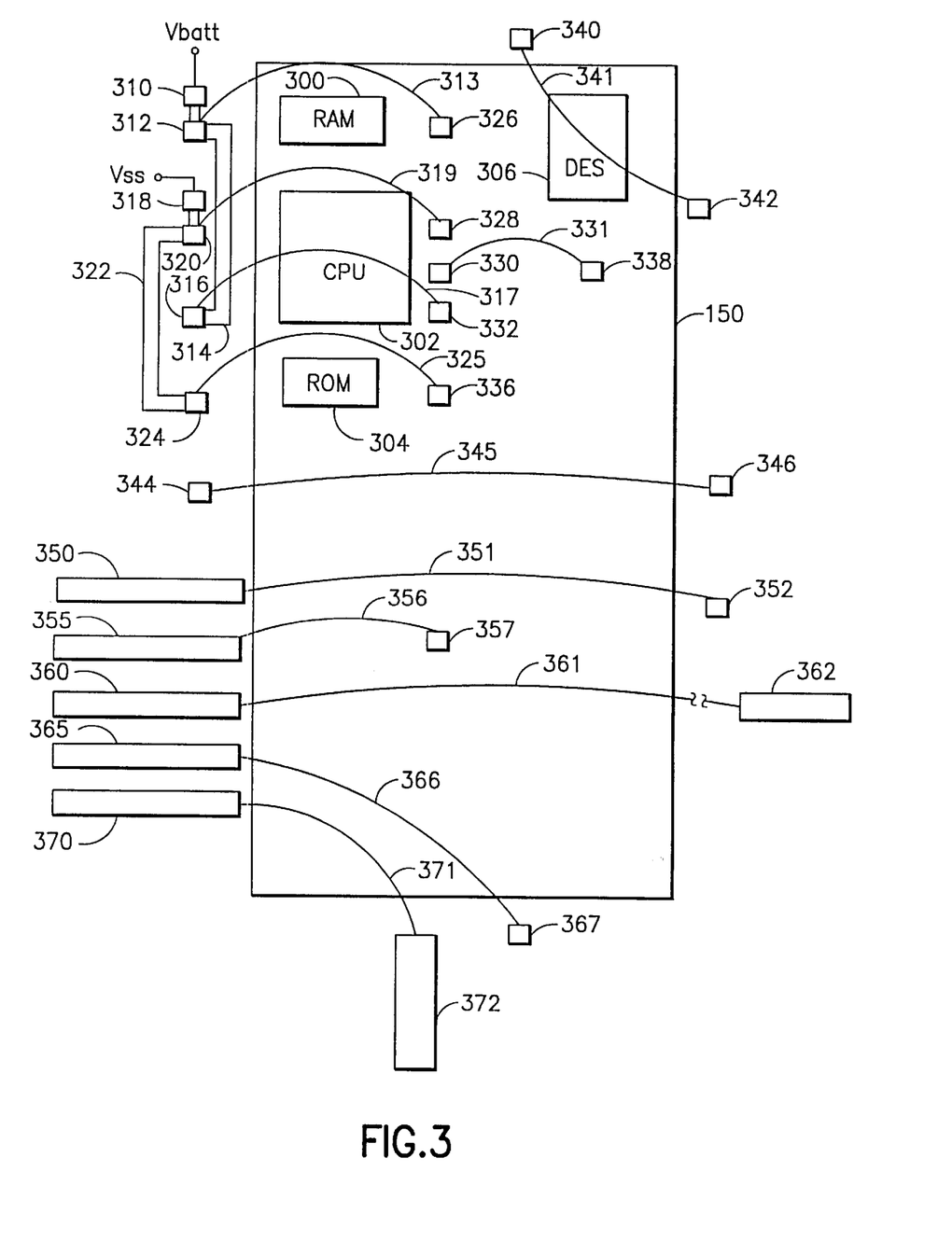
FIG. 3 is a top view of a secure processor of an integrated circuit with an anti-tamper bond wire shield in accordance with the present invention.

FIG. 3 is a top view illustrating, in simplified form, a secure processor of an integrated circuit with an anti-tamper bond wire shield in accordance with the present invention. The secure processor 150, includes exemplary micro-electronic components such as a RAM 300, a central processing unit (CPU) 302, a read-only memory (ROM) 304, and a Data Encryption Standard (DES) processor 306. However, note that the present invention is equally applicable to non-secure processors which may be protected to preserve unencrypted but proprietary information. Thus, the term "processor" as used herein is meant to encompass encrypted processors, non-encrypted processors, and virtually any type of micro-electronic circuit or micro-electronic component.

FIG. 3 is meant to a show a variety of possible arrangements of conductive members such as bond wires in an anti-tamper shield of an IC. It should be understood that not all of the bond wires shown are required, and that the specific number and positioning of the bond wires can vary.

In one example configuration, a signal having a positive voltage $V_{batt}$ may be supplied to a bond pad 310, which is electrically coupled to a bond pad 312, a trace 314, and a bond pad 316. Similarly, a negative voltage $V_{ss}$ is present at a bond pad 318, which is electrically coupled to a bond pad 320, a trace 322, and a bond pad 324. The voltage $V_{batt}$ may be used to provide a current which, when terminated, triggers an automatic erasure (e.g., self-destruct) feature of the processor 150.

Bond wires can be coupled between bond pads which are external to the processor 150 and bond pads which are internal (e.g., located within) the processor 150. For example, a bond wire 313 may be coupled between the external bond pad 312 and the internal bond pad 326 in the region of the RAM 300. Pad 326 is shown as being located outside the RAM 300, but may couple an electrical signal to the RAM 300 via a trace, for example, not shown.

Similarly, in the region of the CPU 302, a bond wire 319 may be coupled between the bond pad 320 which is external to the processor 150 and the bond pad 328 of the CPU 302 which is internal to the processor 150. A bond wire 317 may be coupled between the bond pad 316 which is external to the processor 150 and the bond pad 332 of the CPU which is internal to the processor 150. In the region of the ROM 304, a bond wire 325 may be coupled between the external bond pad 324 and the internal bond pad 336 of the ROM 304.

Bond wires can also be coupled between bond pads which are both internal to the processor 150. For example, a bond wire 331 may be coupled between internal bond pads 330 and 338.

Bond wires can be further be coupled between bond pads which are external to the processor 150. For example, a bond wire 341 may be coupled between external bond pads 340 and 342, and a bond wire 345 may be coupled between external bond pads 344 and 346.

Additionally, bond wires can be coupled between lead frame contacts and external or internal bond pads, or other lead frame contacts. For example, a bond wire 351 may be coupled between a lead frame contact 350 and an external bond pad 352. A bond wire 356 may be coupled between a lead frame contact 355 and an internal bond pad 357. A bond wire 361 may be coupled between a lead frame contact 360 and another lead frame contact 362. As indicated by the broken line, the lead frame contact 362 may be a package lead which is located further from the processor 150 than the contact 360. Note that the positioning of the lead frame contacts and bond pads in FIG. 3 is not necessarily to scale. A bond wire 366 may be coupled between a lead frame contact 365 and an external bond pad 367. A bond wire 371 may be coupled between a lead frame contact 370 and another lead frame contact 372.

Furthermore, a bond wire can be coupled between a bond pad or lead frame contact of the processor 150 directly to a decoder board (e.g., personal computer (PC) board) on which the processor 150 is carried, or any other location which allows the bond wire to carry a current loop or other signal for use by the processor 150. In this case, mere removal of the chip package from the board or other location will rupture the anti-tamper bond wire.

Additionally, a bond wire can be coupled between external pads, such as pads 340 and 342, where the bond wire does not extend over the surface of the processor 150, but extends away from the surface of the processor, for example, in a loop (not shown). A similar configuration can be had with the contacts, such as contacts 370 and 372, where the bond wire 371 extends away from the processor 150. Thus, the bond wire can be routed to a region which is somewhat distant from the processor 150, e.g., where the pirate may not expect to find it.

The secure processor 150 may be carried in an IC which is embedded in a smart card. A smart card is typically a plastic credit-card sized device which contains ICs. The smart card is inserted into a reader to allow a component to interface with the ICs. There are various methods of packaging ICs into a card. For example, after an IC is wire bonded to contacts of a lead frame, epoxy can be transfer molded around the die prior to injection molding of a card. Another approach is to apply epoxy to a cavity in a card body prior to insertion of the contact/die assembly into the same smart card body. In either case, an epoxy encapsulating compound can be made to flow around the conductive members.

Furthermore, the body of the smart card forms part of the encapsulating layer of the IC. Moreover, the bond wires of the IC may be routed in the body of the smart card away from the region in which the IC is embedded such that any tampering with the smart card ruptures the bond wires.

The use of conductive epoxy to provide an anti-tamper shield in a smart card is particularly advantageous since it allows a lower profile for the card. The conductive epoxy can be printed as a thin trace which extends over the IC.

Figure 4:
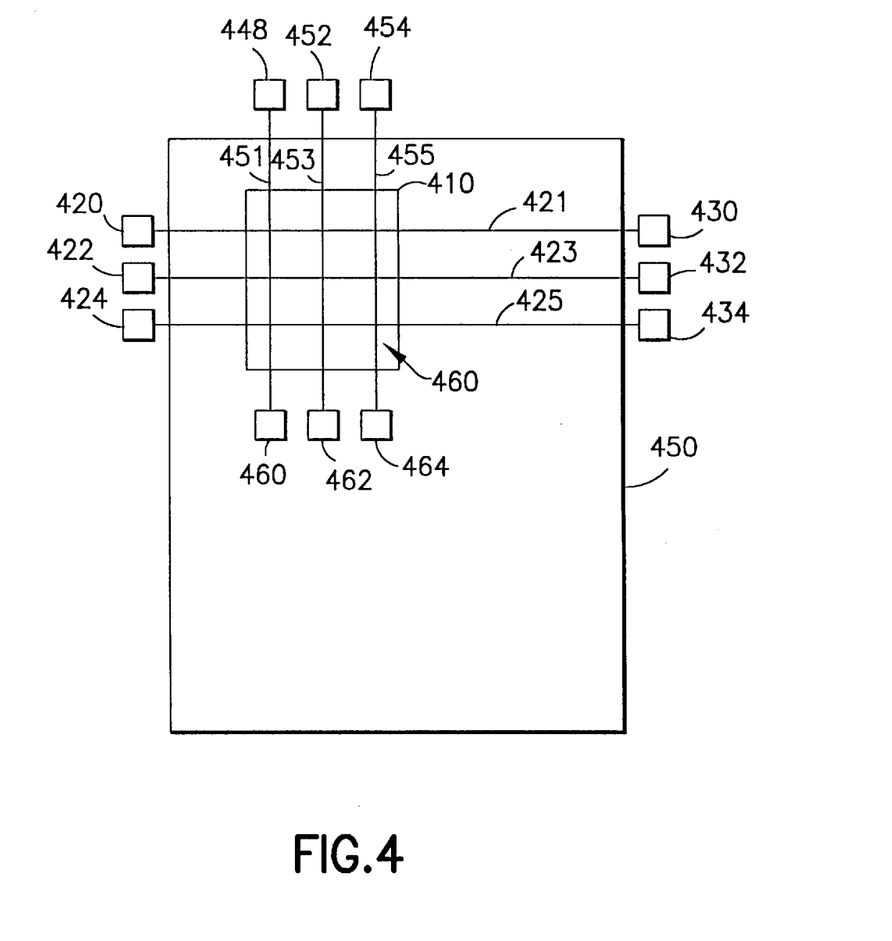
FIG. 4 is a top view of a secure processor of an integrated circuit with an anti-probing wire grid shield in accordance with the present invention.

FIG. 4 is a top view of a secure processor of an integrated circuit with an anti-probing wire grid shield in accordance with the present invention. Bond wires may be provided in a grid pattern with a spacing which is small enough to prevent a probe tip from passing through the mesh or moving easily within the mesh. In fact, this configuration may be used even when the wire does not carry an electrical signal which the processor requires to function. The mere presence of the wires (e.g., dummy wires) in a grid serves as a deterrent to probing.

In an example implementation of a wire grid shield, a processor 450 includes a micro-electronic component 410 such as a memory. Bond wires 421, 423, and 425 are coupled between bond pads 420 and 430, 422 and 432, and 424 and 434, respectively. Similarly, bond wires 451, 453, and 454 are coupled between bond pads 450 and 460, 452 and 462, and 454 and 464, respectively. The wires form a grid pattern, shown generally at 460, which covers the micro-electronic component 410. The dimensions of the grid 460 may be adjusted to aggravate the movement of the tip of a probe which a pirate may use.

The wires of the grid 460 may optionally carry a signal which is used by the micro-electronic circuit 410 to operate. In this case, it may be preferable for some or all of the wires to avoid contacting each other to avoid a short circuit. If so, the wires may be displaced from one another as required to maintain the grid pattern while avoiding a short circuit.

When dummy wires are used in a grid or other pattern, it is desirable to select a wire composition which has a high resistance to the chemical etchants which may be used by a pirate in etching the epoxy or other protective layer of the IC. As mentioned, metals such as gold, for example, have a relatively high resistance to etchants.

Figure 5:
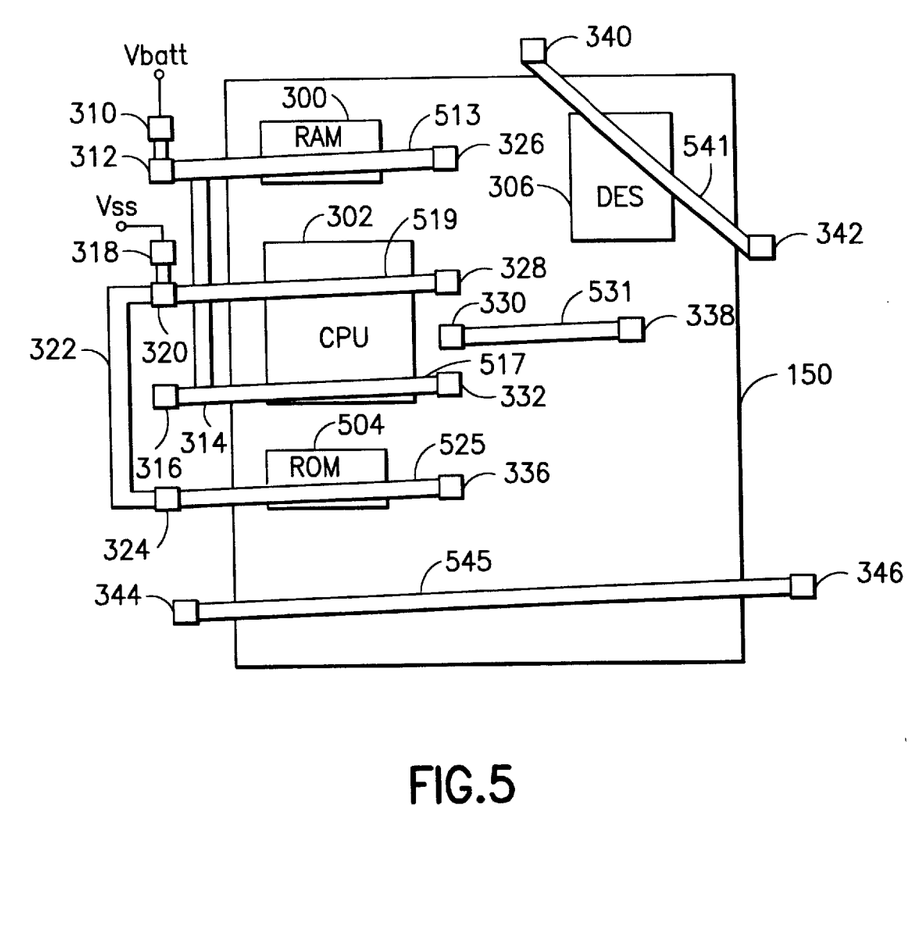
FIG. 5 is a top view of a secure processor of an integrated circuit with anti-tamper conductive epoxy traces in accordance with the present invention.

In FIG. 5, like-numbered elements correspond to the those of FIG. 3. Thin, electrically conductive epoxy traces 513, 517, 519, 525, 531, 541 and 545, analogous to the wires 313, 317, 319, 325, 331, 341 and 345, respectively, of FIG. 3 are used.

Accordingly, it can be seen that there are many possible configurations for using bond wires in an anti-tamper shield to prevent an unauthorized decapsulation of a chip. With the anti-tamper shield of the present invention, a pirate employing a mechanical grinder for decapsulation would have to leave a great deal of the encapsulating compound in place or risk rupturing the bond wires. In fact, the bond wires can be arranged such that most of the epoxy must be left undisturbed to avoid rupturing the wires. If a wire is ruptured, a self-destruct sequence of the chip may be initiated, or a required control signal path may be terminated, thereby requiring a time-consuming and difficult repair by the pirate.

Moreover, even if the wire does not initiate a self-destruct sequence or carry a required control signal, the mere presence of the wire can interfere with efforts to map the chip via an x-ray machine. Thus, the mere presence of "dummy" bond wires in an anti-tamper shield, particularly in a grid pattern, will serve as a deterrent, as the pirate may not know whether rupturing the wires will render the processor non-functional. In either case, the pirate's task is made much more difficult, time-consuming and expensive, if not impossible.

Although the invention has been described in connection with various specific embodiments, those skilled in the art will appreciate that numerous adaptations and modifications may be made thereto without departing from the spirit and scope of the invention as set forth in the claims. For example, the invention is not limited to use with chips which have an epoxy encapsulating layer, but may be adapted for use with a chip which has virtually any type of protective layer, or even no protective layer. For instance, the invention may be used with a device such as an electrically programmable read-only memory (EPROM), which can be erased when exposed to ultraviolet light. An EPROM is typically protected by an air gap and a transparent window. In this case, the electrically conductive member may be carried simply in the air gap, and will pose an obstacle to a pirate even without the epoxy layer.

What is claimed is:

1. An anti-tamper apparatus for protecting an active component of an integrated circuit (IC) from probing, said apparatus comprising:
   a wire for carrying an electric signal used by said active component to function; wherein:
   said wire extends, at least in part, over said active component to hinder access thereto from probing when said active component is functioning.

2. The apparatus of claim 1, wherein:
   said wire extends between first and second terminuses; and
   said first terminus is external to said active component and said second terminus is internal to said active component.

3. The apparatus of claim 1, wherein:
   said wire extends between first and second terminuses; and
   said first and second terminuses are both external to said active component.

4. The apparatus of claim 1, wherein:
   said wire extends between first and second terminuses; and
   said first and second terminuses are both internal to said active component.

5. The apparatus of claim 1, wherein:
   said wire forms a grid pattern.

6. The apparatus of claim 1, wherein:
   said wire is carried, at least in part, within a protective layer of said IC.

7. The apparatus of claim 1, further comprising:
   a metallic shield layer which shields at least a portion of said active circuit.

8. The apparatus of claim 1, wherein:
   said IC is embedded in a smart card; and
   said wire is adapted to rupture when said IC is removed from said smart card.

9. An anti-tamper apparatus for protecting an active component of an integrated circuit (IC) from probing, said apparatus comprising:
   a conductive epoxy member for carrying an electric signal used by said active component to function; wherein:
   said conductive epoxy member extends, at least in part, over said active component to hinder access thereto from probing when said active component is functioning.

10. The apparatus of claim 9, wherein:
    said conductive epoxy member is printed, at least in part, on said active component.

11. The apparatus of claim 9, wherein:
    said IC is embedded in a smart card; and
    said conductive epoxy member is adapted to rupture when said IC is removed from said smart card.

12. The apparatus of claim 9, wherein:
    said conductive epoxy member extends between first and second terminuses; and
    said first terminus is external to said active component and said second terminus is internal to said active component.

13. The apparatus of claim 9, wherein:
    said conductive epoxy member extends between first and second terminuses; and
    said first and second terminuses are both external to said active component.

14. The apparatus of claim 9, wherein:
    said conductive epoxy member extends between first and second terminuses; and
    said first and second terminuses are both internal to said active component.

15. The apparatus of claim 9, wherein:
    said conductive epoxy member is carried, at least in part, within a protective layer of said IC.

16. The apparatus of claim 9, further comprising:
    a metallic shield layer which shields at least a portion of said active circuit.

17. An anti-tamper apparatus for protecting an active component of an integrated circuit (IC) from probing, said apparatus comprising:
    a wire structure which extends, at least in part, over said active component to hinder access thereto.

18. The apparatus of claim 17, wherein:
    said wire structure forms a grid pattern.

19. The apparatus of claim 1, wherein:
    said active component comprises a micro-electronic processor.

20. The apparatus of claim 9, wherein:
    said active component comprises a micro-electronic processor.

21. The apparatus of claim 9, wherein:
    said conductive epoxy member is printed directly on a surface of the active component as a thin epoxy trace.

* * * * *